United States Patent
Bovet et al.

(10) Patent No.: US 8,244,413 B2
(45) Date of Patent: Aug. 14, 2012

(54) SECURE COMMAND METHOD AND DEVICE FOR REMOTE MAINTENANCE TERMINAL

(75) Inventors: Michel Bovet, Tournefeuille (FR); Georges Ric, Frouzins (FR)

(73) Assignee: Airbus Operations SAS, Toulouse (FR)

( * ) Notice: Subject to any disclaimer, the term of this patent is extended or adjusted under 35 U.S.C. 154(b) by 436 days.

(21) Appl. No.: 12/355,404

(22) Filed: Jan. 16, 2009

(65) Prior Publication Data
US 2009/0198390 A1 Aug. 6, 2009

(30) Foreign Application Priority Data
Feb. 1, 2008 (FR) .................................. 08 50651

(51) Int. Cl.
*G01C 23/00* (2006.01)
*G06F 7/74* (2006.01)

(52) U.S. Cl. .............. 701/3; 709/217; 709/225; 726/4; 726/13

(58) Field of Classification Search ................ 701/2, 3, 701/4, 5, 6, 7, 8, 9, 10, 11, 12, 13, 14, 15, 701/16, 17, 18; 709/217, 206, 223; 726/4, 726/5, 11
See application file for complete search history.

(56) References Cited

U.S. PATENT DOCUMENTS

| | | | |
|---|---|---|---|
| 5,930,399 A * | 7/1999 | Kadyk et al. | 382/245 |
| 6,189,097 B1 * | 2/2001 | Tycksen et al. | 713/156 |
| 7,194,552 B1 * | 3/2007 | Schneider | 709/245 |
| 7,206,932 B1 * | 4/2007 | Kirchhoff | 713/152 |
| 7,962,557 B2 * | 6/2011 | Lu et al. | 709/206 |
| 2001/0003827 A1 | 6/2001 | Shimamura | |
| 2004/0204805 A1 * | 10/2004 | Betters et al. | 701/35 |
| 2004/0268151 A1 | 12/2004 | Matsuda | |
| 2006/0101137 A1 * | 5/2006 | Suto | 709/223 |
| 2007/0299956 A1 * | 12/2007 | Odaka et al. | 709/223 |
| 2008/0244017 A1 * | 10/2008 | Gershinsky et al. | 709/206 |
| 2010/0094484 A1 * | 4/2010 | Cornell et al. | 701/3 |
| 2010/0106351 A1 * | 4/2010 | Hanssen et al. | 701/22 |
| 2010/0274692 A1 * | 10/2010 | Hammad | 705/30 |
| 2011/0138013 A1 * | 6/2011 | Zhong et al. | 709/217 |
| 2011/0231546 A1 * | 9/2011 | Nathanson | 709/224 |

FOREIGN PATENT DOCUMENTS
EP 1 331 587 A2 7/2003
EP 1 630 677 A1 3/2006

* cited by examiner

*Primary Examiner* — Paul N Dickson
*Assistant Examiner* — Karen A Beck
(74) *Attorney, Agent, or Firm* — Oblon, Spivak, McClelland, Maier & Neustadt, L.L.P.

(57) ABSTRACT

A method executes at least one instruction in an on-board maintenance device from a remote system connected to the maintenance device via a communication network. The method includes receiving at least one datum representative of at least one command having a correspondence with the at least one instruction. The method also includes filtering the at least one received datum. In response to the filtering, if the at least one received datum represents a valid command, the method includes converting the at least one received datum to identify the at least one instruction.

19 Claims, 6 Drawing Sheets

| ASCII CODE | CONTROL CHARACTER | ASCII CODE | | ASCII CODE | CHARACTER | ASCII CODE | CHARACTER |
|---|---|---|---|---|---|---|---|
| 000 | NUL | 032 | SP | 064 | @ | 096 | ` |
| 001 | SOH | 033 | ! | 065 | A | 097 | a |
| 002 | STX | 034 | " | 066 | B | 098 | b |
| 003 | ETX | 035 | # | 067 | C | 099 | c |
| 004 | EOT | 036 | $ | 068 | D | 100 | d |
| 005 | ENQ | 037 | % | 069 | E | 101 | e |
| 006 | ACK | 038 | & | 070 | F | 102 | f |
| 007 | BEL | 039 | ' | 071 | G | 103 | g |
| 008 | BS | 040 | ( | 072 | H | 104 | h |
| 009 | HT | 041 | ) | 073 | I | 105 | i |
| 010 | LF | 042 | * | 074 | J | 106 | j |
| 011 | VT | 043 | + | 075 | K | 107 | k |
| 012 | FF | 044 | , | 076 | L | 108 | l |
| 013 | CR | 045 | - | 077 | M | 109 | m |
| 014 | SO | 046 | . | 078 | N | 110 | n |
| 015 | SI | 047 | / | 079 | O | 111 | o |
| 016 | DLE | 048 | 0 | 080 | P | 112 | p |
| 017 | DC1 | 049 | 1 | 081 | Q | 113 | q |
| 018 | DC2 | 050 | 2 | 082 | R | 114 | r |
| 019 | DC3 | 051 | 3 | 083 | S | 115 | s |
| 020 | DC4 | 052 | 4 | 084 | T | 116 | t |
| 021 | NAK | 053 | 5 | 085 | U | 117 | u |
| 022 | SYN | 054 | 6 | 086 | V | 118 | v |
| 023 | ETB | 055 | 7 | 087 | W | 119 | w |
| 024 | CAN | 056 | 8 | 088 | X | 120 | x |
| 025 | EM | 057 | 9 | 089 | Y | 121 | y |
| 026 | SUB | 058 | : | 090 | Z | 122 | z |
| 027 | ESC | 059 | ; | 091 | [ | 123 | { |
| 028 | FS | 060 | < | 092 | \ | 124 | \| |
| 029 | GS | 061 | = | 093 | ] | 125 | } |
| 030 | RS | 062 | > | 094 | ^ | 126 | ~ |
| 031 | US | 063 | ? | 095 | _ | 127 | DEL |

Fig. 4

| Command name | Instructions |
|---|---|
| TEST : FMU | Set_Param(a,b,c)<br>AutoTest_FMU1<br>AutoTest_FMU2 |
| : | : |
| Access data x32 | Return(x32, "a/b/c") |

SECURE COMMAND METHOD AND DEVICE FOR REMOTE MAINTENANCE TERMINAL

The present invention relates to maintenance operations and functional tests performed in aircraft, and more particularly to a secure command method and device for a remote maintenance terminal, so that functional tests on the assembly line or during operation of an aircraft can be carried out from a remote station.

To optimize the reliability of aircraft and increase their profitability, on-line maintenance operations are frequently performed between the flying phases.

PRIOR ART

In general, such operations, for maintenance operators, for example, consist in analyzing data stored in memory during flight, in modifying certain parameters of the aircraft or certain software data and/or in launching test software applications. The analyzed data are often obtained from transducers and stored in memory in a central diagnostic and storage device accessible via a man-machine interface of MCDU type (initials for Multi-Control Display Unit in English terminology) or of OMT type (initials for Onboard Maintenance Terminal in English terminology). This interface, via which interactive operations can be launched, makes it possible to analyze data stored in memory, to access parameters of the aircraft and more generally to execute test and maintenance functions. By way of illustration, the Airbus A320, A330 and A340 are equipped with MCDUs and the Airbus A380 is equipped with an OMT (Airbus A320, A330, A340 and A380 are trademarks).

Access to aircraft maintenance systems is generally limited to fixed physical stations provided on board in the cockpit. Thus, when the aircraft is on the ground, a maintenance operator can board the aircraft to access and analyze the data stored in memory, to modify the parameters thereof if necessary and to launch test applications.

In order to optimize task sequencing, the current devices generally require the ongoing presence of an operator, in order to verify that the operations have taken place properly.

Similarly, during aircraft assembly, the teams of the final assembly sequences rely on interactive maintenance tools to perform all or part of the functional tests of the airplane.

However, despite the performances of the maintenance stations, means for automating certain tests do not exist.

In fact, although certain maintenance stations provided on board aircraft can be connected to a communication network for exchange of data between the aircraft and remote equipment, the network connection does not permit remote control of the applications implemented on board the aircraft or transmission of applications, for security reasons.

The invention is able to solve at least one of the problems mentioned in the foregoing.

OBJECT OF THE INVENTION

The object of the invention is therefore a method for executing at least one instruction in an on-board maintenance device from a remote system connected to the said maintenance device via a communication network, this method comprising the following steps:

receiving at least one datum representative of at least one command associated with the said at least one instruction;
filtering the said at least one received datum; and,
if the said filtered command is valid, identifying the said at least one instruction.

Thus a vehicle such as an aircraft adapted to employ the method according to the invention has at its disposal means for accessing the interactive maintenance tools remotely, without reducing its level of security. In addition, such a method offers optimized service to the operators of final assembly sequences for the conduct of functional tests, by providing the possibility of developing means for automating tests.

In addition, since the operators are able to connect a mobile terminal and to use all or some of the automatic test routines, the method according to the invention offers the possibility of performing non-regression functional tests on the production flow up to delivery.

Advantageously, the method additionally comprises a step of verifying a signature of the said at least one received datum permitting authentication thereof.

According to a particular embodiment, the method additionally comprises a preliminary step of storing in memory the said correspondence between the said at least one datum and the said at least one instruction.

Advantageously, the said filtering step is an iterative filtering step based on at least two distinct criteria for optimizing the processing times.

According to a particular embodiment, at least one of the said at least two criteria is associated with the protocol for transmission of the said at least one datum. Similarly, according to a particular embodiment, at least one of the said at least two criteria is related to the encoding of the said at least one datum representative of the said at least one command.

Advantageously, the method additionally comprises a step of transmitting at least one information item related to execution of the said at least one instruction, making it possible to transmit a result in response to a command. Preferably, to permit authentication of the said at least one information item, the method additionally comprises a step of signing the said at least one information item.

Another object of the invention is a device comprising means adapted to employment of each of the steps of the method described in the foregoing as well as an aircraft comprising such a device.

BRIEF DESCRIPTION OF THE DRAWINGS

Other advantages, objectives and characteristics of the present invention become apparent from the detailed description provided hereinafter by way of non-limitative example, with reference to the attached drawings, wherein:

FIG. 2, comprising

DETAILED DESCRIPTION OF THE INVENTION

Figure 1:
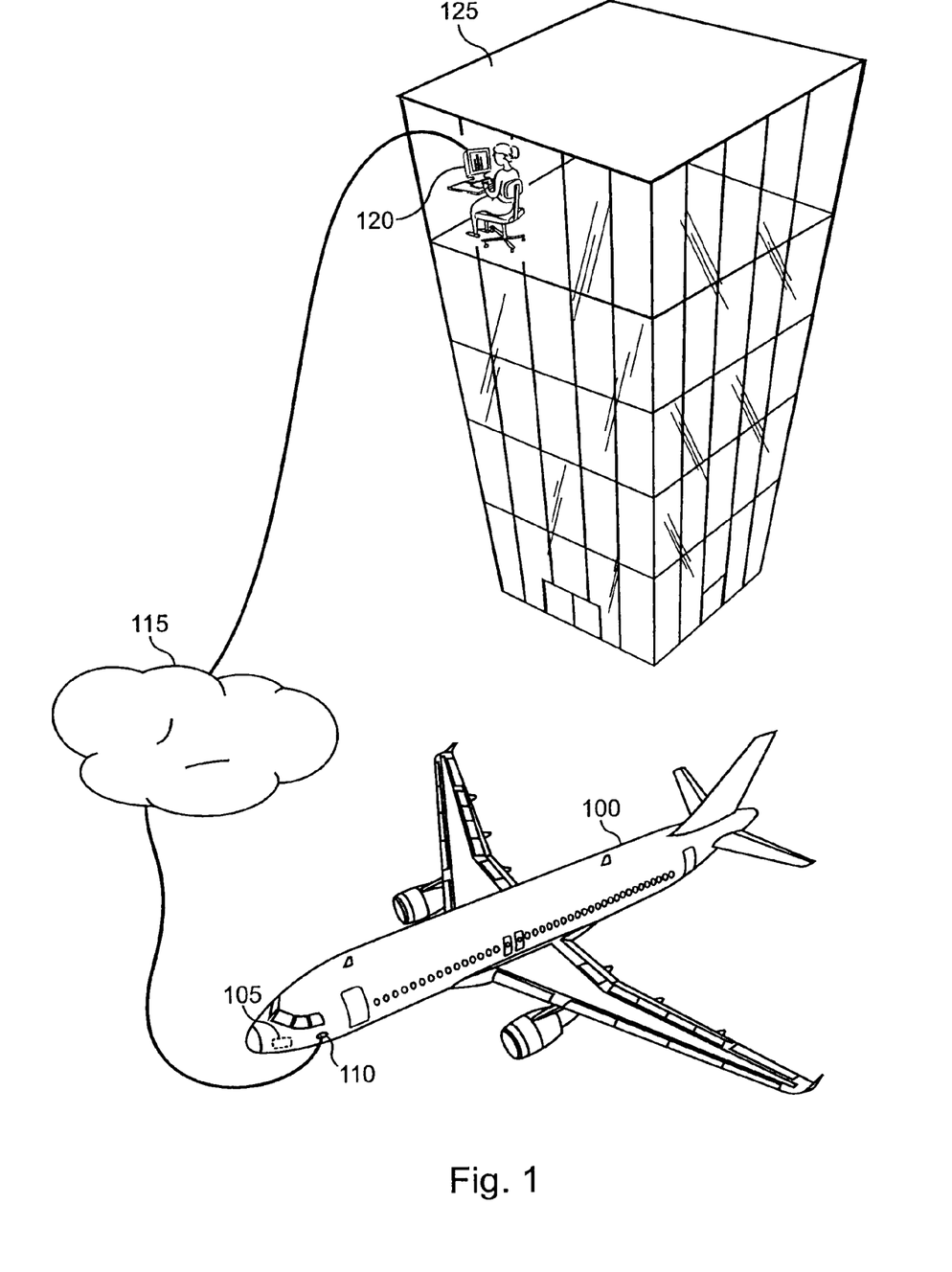
FIG. 1 schematically represents an example of an environment in which the present invention may be employed.

FIG. 1 schematically represents an example of an environment in which the present invention can be employed. Illustrated here is an aircraft 100 comprising a maintenance device 105 containing, for example, centralized diagnostic and storage tools, connected to a network connection port 110 accessible, in the present example, from the outside of the aircraft. In this case, network connection port 110-1 is connected to network 115.

Device 105, for example, is connected to control transducers (not illustrated) of the engines and actuators of the landing gear and control surfaces.

An on-line remote maintenance station 120, located in a maintenance center 125, for example, is connected to device 105 by a communication network 115 and port 110-1.

Thus, when aircraft 100 is on the ground, during assembly or operation thereof, a maintenance operator is able, by means of remote station 120, to analyze the data of the aircraft, to modify the parameters thereof and/or to monitor the execution of maintenance application modules implemented in aircraft 100.

In addition to its standard functions, device 105 comprises means for employing the invention that are advantageously based on a software architecture comprising substantially the three following modules, which may be implemented within a single software application or in the form of independent modules, a communication module;

a filtering module; and a conversion or translation module.

Alternatively, these three modules or some of them may be implemented in one or more other devices.

Figure 2A:
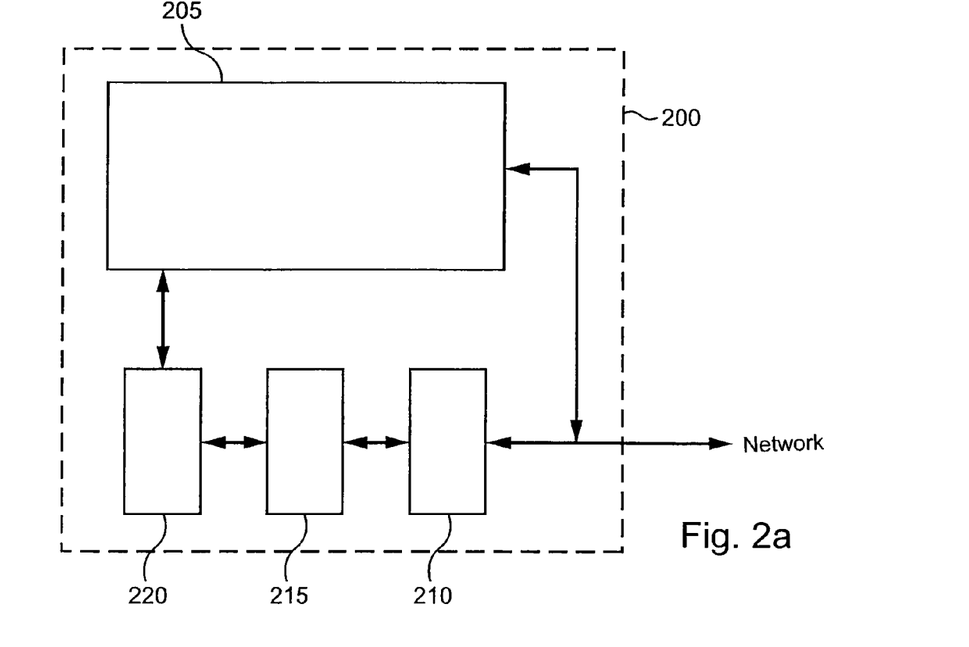
FIGS. 2a and 2b, illustrates two examples of a software architecture that can be implemented in an aircraft in order to employ the invention.
Figure 2B:
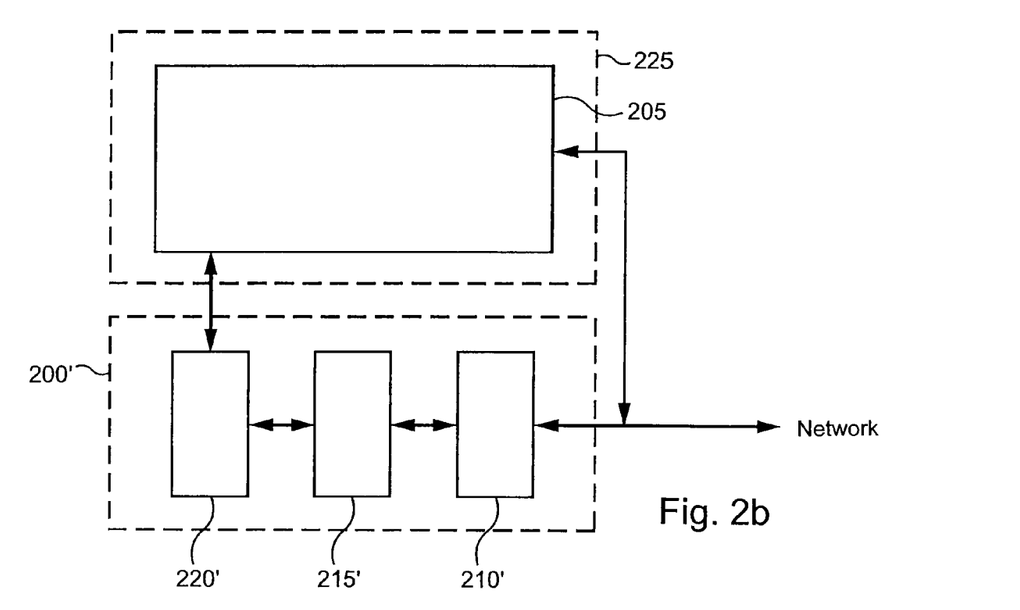

FIG. 2, comprising FIGS. 2a and 2b, illustrates two examples of a software architecture that can be implemented in an aircraft in order to employ the invention.

According to the first example illustrated in FIG. 2a, the software architecture adapted for employment of the invention is implemented in the maintenance device. As illustrated, maintenance device 200 in this case comprises maintenance application modules 205. Although all of these modules are represented here in the form of a single element, it must be understood that in general they are separate modules. The maintenance application modules are connected to the network in order to receive and/or transmit data.

Maintenance device 200 additionally comprises a communication module 210, a filtering module 215 and a conversion module 220. Communication module 210 is preferably a secure communication module.

Communication module 210 is connected to the network via a standard link such as an Ethernet link, for receiving and/or transmitting data. Such a link may be hard-wired or wireless. Communication module 210 is also connected to filtering module 215, which in turn is connected to conversion module 220.

According to the second example illustrated in FIG. 2b, the software architecture adapted for employment of the invention is implemented in a device separate from the maintenance device. As illustrated, maintenance application modules 205 are implemented in a maintenance device 225, separate from device 200' comprising communication module 210', filtering module 215' and conversion module 220'.

The purpose of communication module 210 or 210' is to receive the data transmitted via the network to which it is connected and to transmit data over this same network.

Advantageously, the exchanged data are signed. It is recalled here that the signature makes it possible to authenticate the source of a datum as well as the integrity of data.

Alternatively, only the received data, the transmitted data or certain types of data are signed.

In complementary manner, it is possible to encipher the data in order that they are comprehensible only to the recipient.

According to a particular embodiment, the communication module and the remote station each comprise keys for adding a signature to the transmitted data and for verifying such a signature. In this way it is possible to authenticate the data source and to verify that the exchanged data are correct and reliable.

The signature mechanisms employed are preferably standard algorithms based on hash functions such as the MD5 or SHA-1 algorithms.

The purpose of filtering module 215 or 215' is to filter the data received from the network in order to transmit only the correctly formatted data to the conversion module, meaning that only the information items comprehensible to the conversion module are transmitted thereto.

The filtering module is preferably based on the screen principle, or in other words on an interactive mechanism, according to which a plurality of filter levels is used to optimize the processing time. It is therefore composed of a plurality of elements for progressively finer filtration of the received data, in order to pass only the data corresponding to valid commands generated by remote stations.

The filtering module requires that a command format be defined, so that only a certain type of network frames is processed. The format and the associated transport protocol may be defined in the form of parameters accessible to the filtering module. For example, such parameters may specify that the commands are received in the form of Ethernet frames, indicate the sources authorized to transmit such commands, impose a maximum frame lifetime beyond which the frames are no longer considered and indicate the characters that can be validly used to encode a command in a frame.

By way of illustration, the filtering of Ethernet frames may be effected in three steps.

Figure 3:
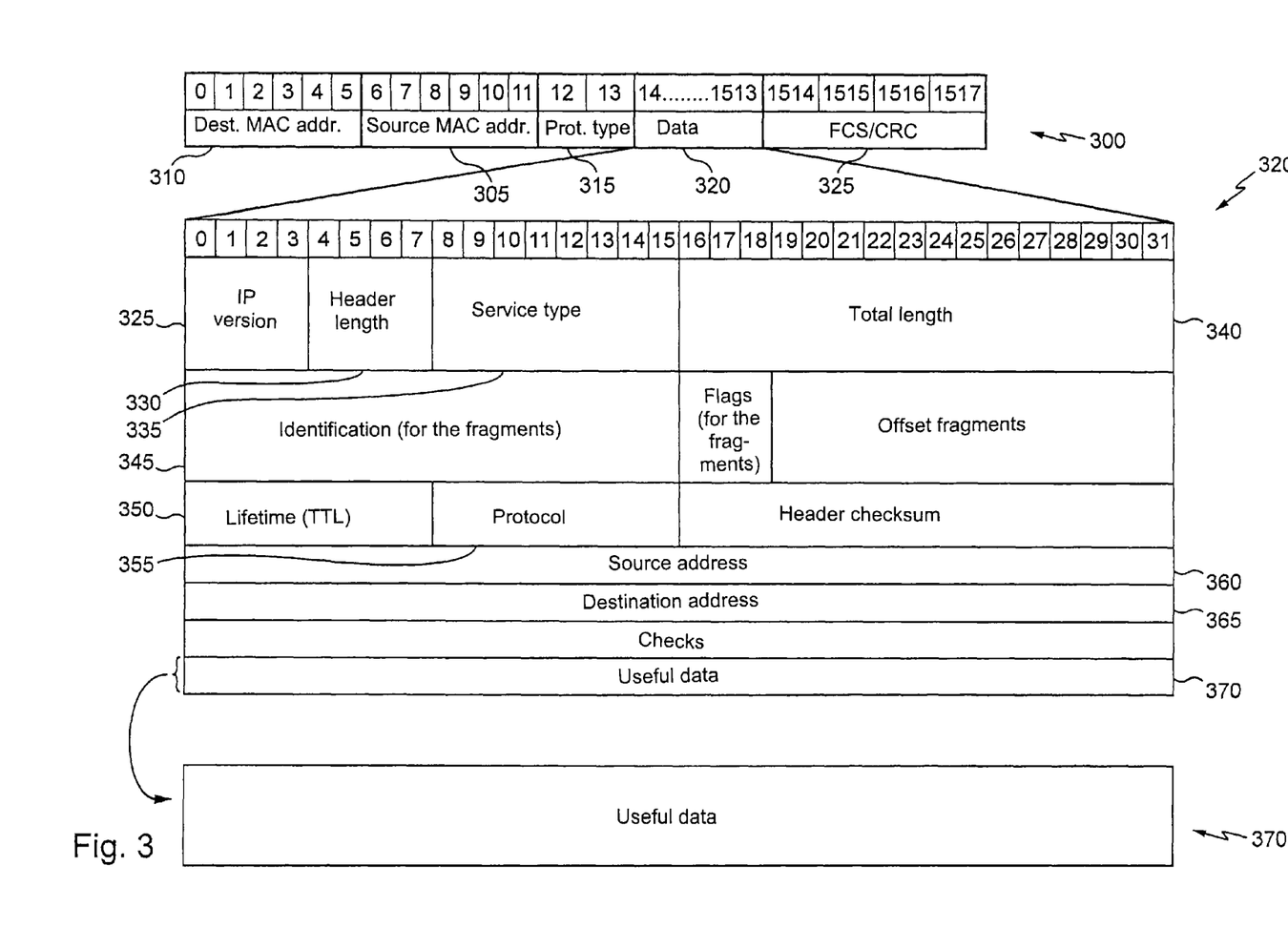
FIG. 3 partially represents an Ethernet frame used to transmit a command that can be subjected to filtering.

FIG. 3 partially represents an Ethernet frame 300 that can be subjected to filtering according to these three steps.

Firstly, each frame is analyzed by verifying, for example, the physical source and destination addresses 305 and 310 respectively, especially the MAC addresses (acronym for Media Access Control in English terminology), the protocol type 315 and the signature 325 of the complete frame. The data 320 of the frame are not analyzed in this first step.

If the physical source and destination addresses 305 and 310 respectively, the protocol type 315 and the signature 325 are not in conformity with the parameters of the filtering module, the frame is rejected.

In contrast, if the physical source and destination addresses 305 and 310 respectively, the protocol type 315 and the signature 325 are in conformity with the parameters of the filtering module, a second filtering step is performed.

It should be noted here that the first filtering step may be applied to data other than those cited, or else to fewer data.

The second step consists, for example, in analyzing the data header 320. In particular, this second filtering step may consist in verifying the IP version (initials for Internet Protocol in English terminology) 325, the header length 330, the service type 335, the total data length 340, the identification 345 used to reconstitute the fragments, the lifetime 350, also known as TTL (initials for Time To Live in English terminology), the protocol 355 and the source and destination addresses 360 and 365 respectively.

Once again, if not all of these information items are in conformity with the parameters of the filtering module, the frame is rejected. In contrast, if all of these information items are in conformity with the parameters of the filtering module, a third filtering step is performed.

It should be noted here also that the second filtering step may be applied to data other than those cited, or else to fewer data.

Figure 4:
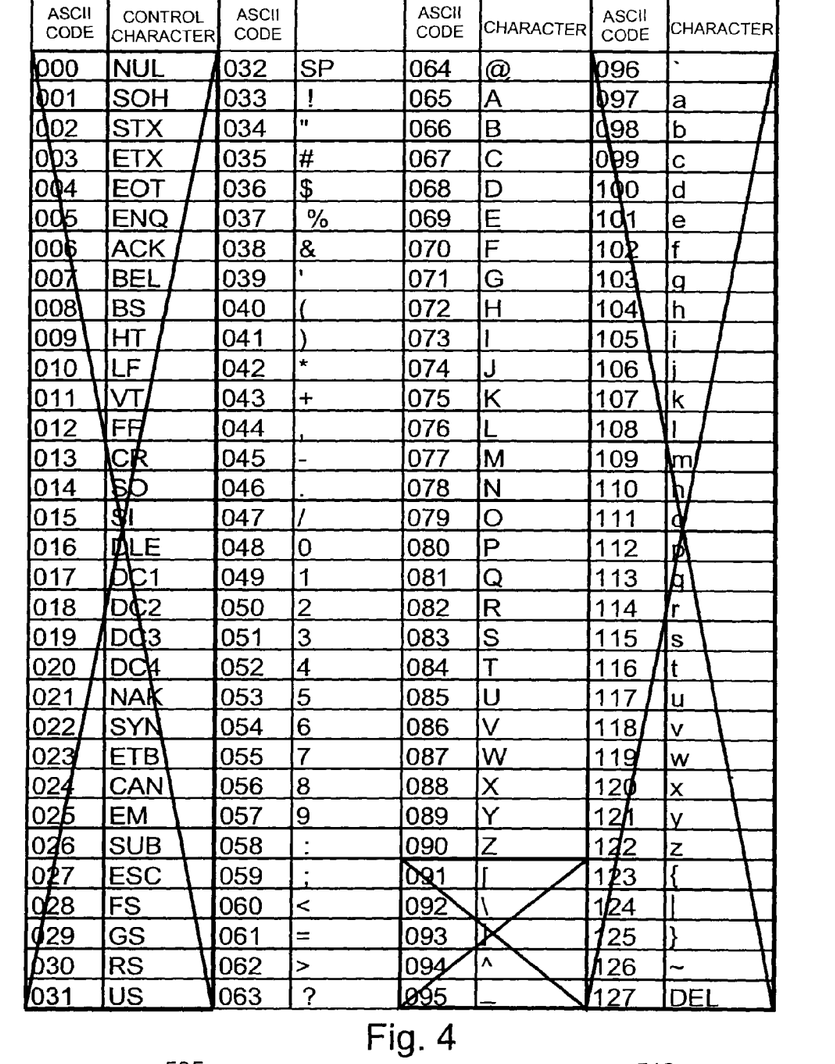
FIG. 4 represents an ASCII table and more particularly characters that can be used to transmit a command to an aircraft without compromising the security thereof.

The third step consists in this case of analyzing the characters of the useful data 370 of the frame. This step therefore makes it possible to verify that the characters necessary for construction of the command cannot be used to construct the executable code. Advantageously, all the characters of the useful data must be chosen from the ASCII table, within the values between 032 and 090, as illustrated in FIG. 4.

If a character of the useful data 370 does not belong to the values between 032 and 090 of the ASCII table, the frame is rejected. On the other hand, if all of the characters of the useful data 370 belong to the values between 032 and 090 of the ASCII table, the frame is transmitted to conversion module 220 or 220'.

Naturally the third filtering step may be applied to other criteria, especially to more restrictive criteria.

The purpose of conversion module 220 or 220' is to establish an interface between the application modules 205 of the maintenance device and the network.

This module is preferably developed in such a way that only the commands linked to instructions corresponding to types of applications hosted on the maintenance software platform of the aircraft will have any action. This means that this module knows the instructions that may be executed by each application. In other words, a list of instructions or instruction sequence is preferably stored in memory beforehand. Such a list defines a set of configurations of possible strings of instructions. This list may also define the prohibited combinations.

This configuration is constructed in such a way that the string of instructions of an application is known a priori. This permits the conversion module to verify that the commands that it receives and the string of associated instructions is in conformity with what the application is supposed to execute. This verification permits the conversion module to reject any unexpected string and thus ensures that dangerous operations cannot be executed.

In a particular embodiment, the conversion module uses a table of correspondence between the command names and the effective functions, or in other words instruction sequences, in order to associate one or more instructions with the names of commands received from the remote station. It should be noted here that the instructions may assume a plurality of forms. They may be, for example, pointers directed at functions or else commands interfaced with the operating system of the maintenance device. The instructions make it possible in particular to simulate an action entered by a user via the interface of the maintenance device.

Figure 5:
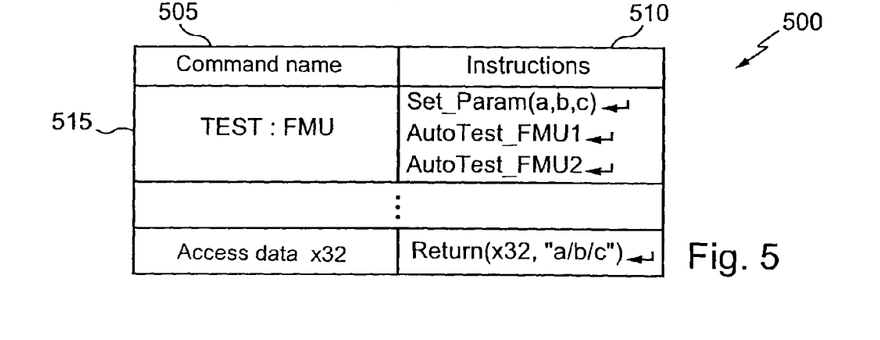
FIG. 5 illustrates an example of a correspondence table that can be used by a conversion module to establish correspondence links between commands and instructions.

FIG. 5 illustrates an example of a correspondence table 500 that can be used by conversion module 220 or 220'.

Correspondence table 500 in this case comprises two columns: one column 505 containing the command names and one column 510 containing the list of instructions associated with each command.

Row 515 illustrates an example of a command to test a flight management device, known as FMU (initials for Flight Management Unit in English terminology). The name of the command that can be used by a maintenance operator from a remote station in this case is TEST: FMU. As illustrated, this command corresponds to execution of the instruction sequence comprising the instructions Set_Param(a, b, c), AutoTest_FMU1 and AutoTest_FMU2.

After a command has been analyzed and declared to be in conformity, the conversion module transmits the corresponding instructions to the application in question. The application executes the instructions and in general returns a response. This response is received by the conversion module, which constructs a response message, preferably signed.

By way of illustration, and returning to the example illustrated in FIG. 5, the mode of operation for execution of instructions corresponding to the TEST: FMU command is the following, the operator enters the command TEST: FMU at the remote station;

the TEST: FMU command is signed then transmitted to the aircraft via a communication network;

the signature of the command received by the aircraft is verified;

the command is filtered;

the sequence of instructions corresponding to the filtered command is identified, being in this case the instructions Set_Param(a, b, c), AutoTest_FMU1 and AutoTest_FMU2;

these instructions are transmitted by a software layer of API type (initials for Application Programming Interface in English terminology) to the intended applications (as if the command had been generated by keystrokes at a fixed station);

the applications in question execute the instructions according to the command and transmit the results to the conversion module via the software layer of API type; and the conversion module forms a response message, for example by constructing a screen page or part of a screen page comprising the results, signs the response message to attest as to the origin and integrity of the information furnished and transmits the response message to the remote station via the communication network.

It is also possible, in the case of automatic tests, to use a software application implemented in the remote station to generate a string of commands in order to create a complete test scenario.

Figure 6:
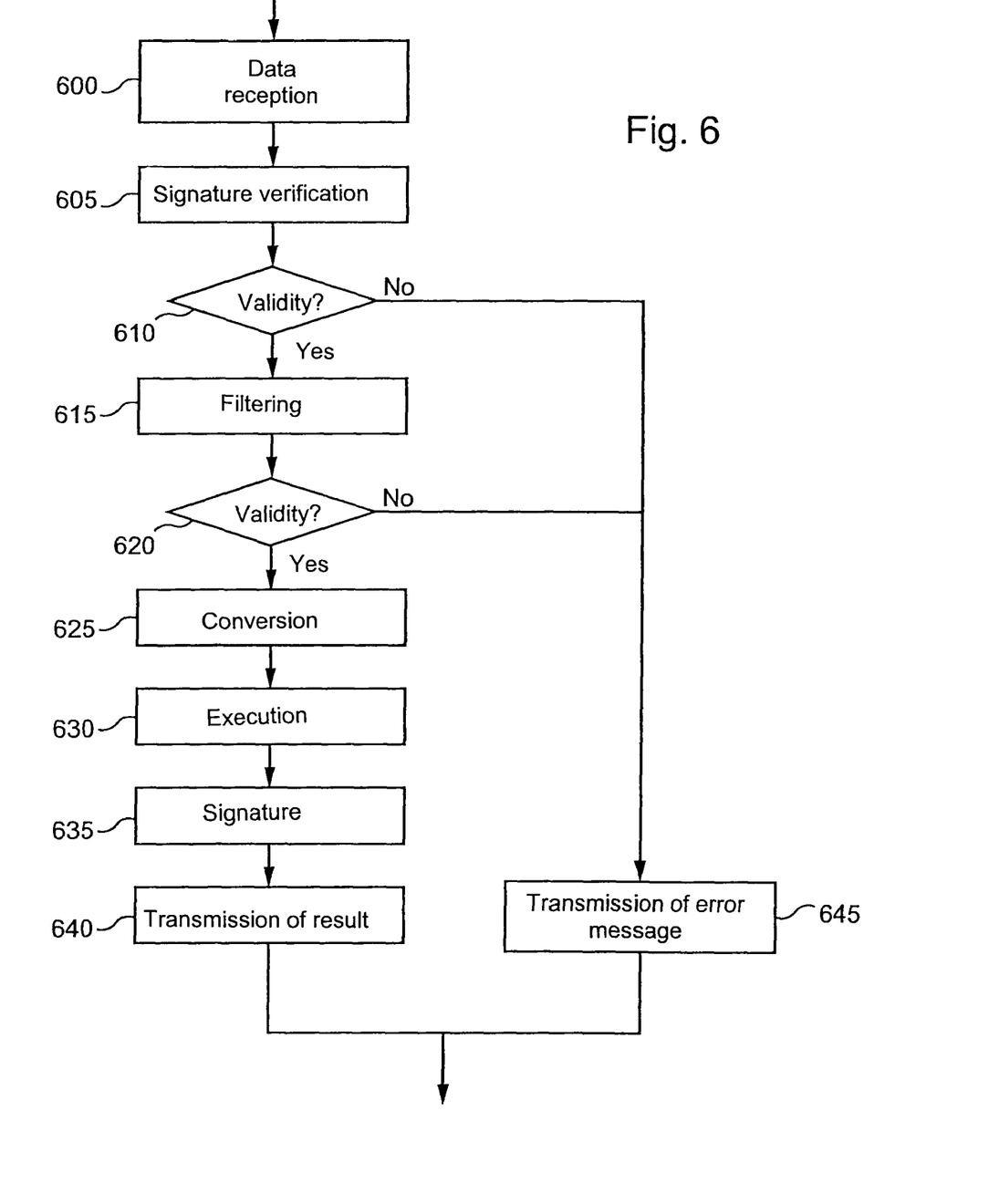
FIG. 6 illustrates some of the steps employed by a maintenance device of an aircraft or by an associated device to execute instructions on the basis of commands received from a remote station.

FIG. 6 illustrates some of the steps employed by a maintenance device of an aircraft or by an associated device in order to execute instructions starting from names of commands received from a remote station.

After data that may correspond to one or more names of commands have been received (step 600), the signature of the received data is verified (step 605) according to a standard algorithm. The validity of the data is then tested (step 610). If the data are valid, a filtering step is performed (step 615) and a new validity test is performed (step 620). If the data are valid, the instructions corresponding to the data are identified (step 625).

The identified instructions are then executed by the associated applications (step 630) and the result of execution of these instructions is formulated and signed (step 635) before being transmitted to the remote station (step 640).

If the data are not valid, an error message is preferably transmitted to the remote station (step 645).

Figure 7:
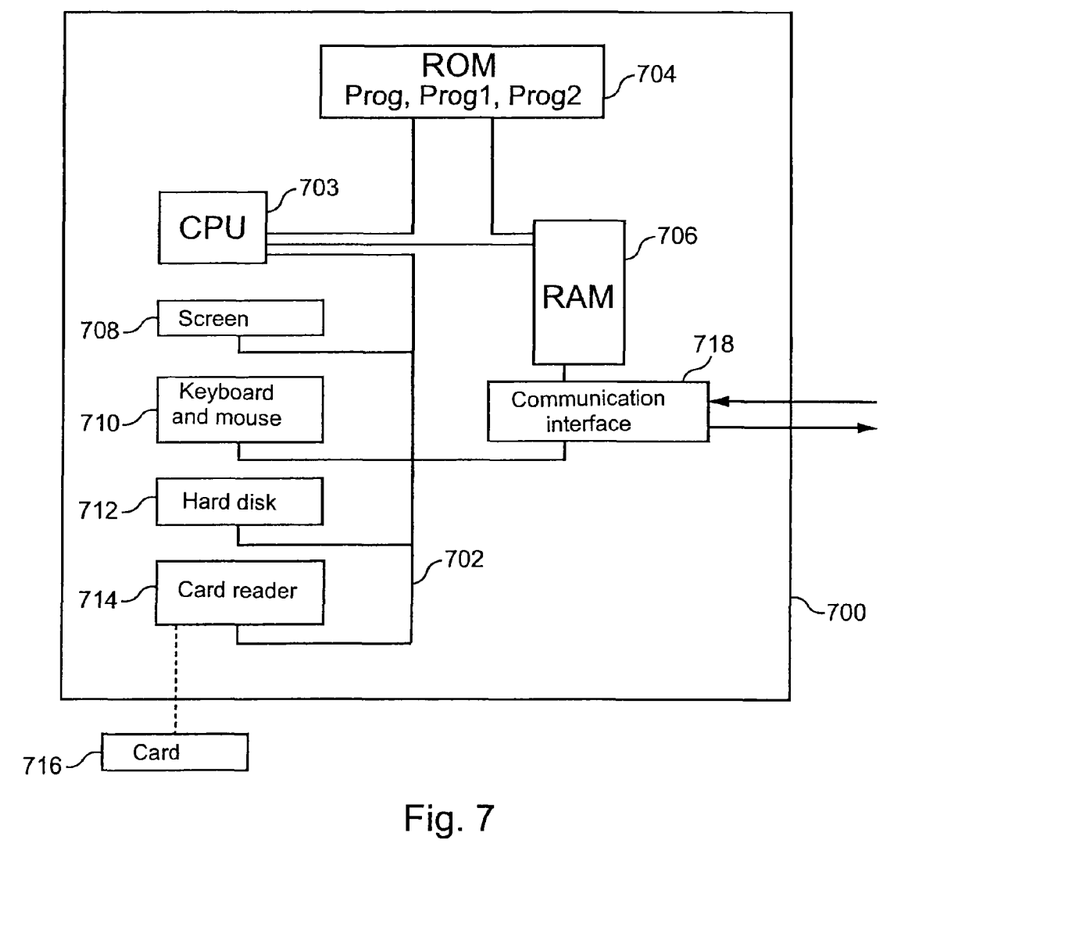
FIG. 7 illustrates an example of a device adapted to employ the invention or part of the invention.

A device adapted for employment of the invention or part of the invention is illustrated in FIG. 7. Device 700 is, for example, a calculator or a microcomputer.

In the present case, device 700 is provided with a communication bus 702, to which there are connected:

a central processing unit or microprocessor 703 (CPU, Central Processing Unit);

a permanent memory 704 (ROM, the acronym for Read Only Memory in English terminology), which may be provided with the programs "Prog", "Prog1" and "Prog2";

a volatile memory or cache memory 706 (RAM, the acronym for Random Access Memory in English terminology), which is provided with registers capable of recording variables and parameters created and modified in the course of execution of the aforesaid programs; and a communication interface 718, capable of transmitting and receiving data.

Optionally, device 700 may also be provided with:

a screen 708, for visualizing data and/or for acting as a graphical interface with the user who will be able to interact with the programs according to the invention, by means of a keyboard and of a mouse 710, or of another pointing device such as a light pen, a touch screen or a remote controller;

a hard disk 712, which can be loaded with the aforesaid programs "Prog", "Prog1" and "Prog2" and with processed data or data to be processed according to the invention; and a memory card reader 714 capable of receiving a memory card 716 and reading or writing therein processed data or data to be processed according to the invention.

The communication bus permits communication and interoperability between the different elements included in device 700 or connected thereto. The representation of the bus is not limitative and, in particular, the central unit is capable of communicating instructions to any element of device 700 directly or via another element of device 700.

The executable code that in each program permits the programmable device to employ the process according to the invention may be stored, for example, on hard disk 712 or in read-only memory 704.

According to one variant, memory card 716 may contain data, especially signature keys, as well as the executable code of the aforesaid programs, which code will be stored on hard disk 712 once it has been read by device 700.

According to another variant, it will be possible for the executable code of the programs to be received at least partly via interface 718 to be stored in a manner identical to that described in the foregoing.

More generally, it will be possible for the program or programs to be loaded into one of the storage means of device 700 before being executed.

Central unit 703 will command and direct the execution of the instructions or portions of software code of the program or programs according to the invention, which instructions are stored on hard disk 712 or in read-only memory 704 or else in the other aforesaid storage elements. During boot-up, the program or programs stored in a non-volatile memory, such as hard disk 712 or read-only memory 704, are transferred into random-access memory 706, which then contains the executable code of the program or programs according to the invention as well as registers for storing in memory the variables and parameters necessary for employment of the invention.

The communication apparatus containing the device according to the invention may also be a programmed apparatus. This apparatus then contains the code of the computer program or programs resident, for example, in an application-specific integrated circuit (ASIC).

It should be noted that the maintenance application modules, just as all software applications installed on-board in aircraft, are developed in accordance with strict aeronautical standards, which make it possible to guarantee a certain level of security and to demonstrate a level of prediction of the behavior of the system.

By way of illustration, the hosting platform of the maintenance application modules, for which the desired software quality assurance level is DAL C, may be developed in such a way that the level of control of the on-board code ensures in particular the integrity of the generated information items (as an example, the hosting platform is developed according to the DO-178B aeronautical standard).

Thus the employment of the invention in such a context makes it possible to guarantee a certain level of integrity of the data and results transmitted to the remote station.

Naturally, to satisfy specific needs, a person skilled in the art of the invention will be able to apply modifications in the foregoing description.

The invention claimed is:

1. A method for executing at least one instruction having at least one parameter in an on-board maintenance device from a remote system connected to the maintenance device via a communication network, the method comprising:

receiving at least one datum representative of at least one command having a correspondence with the at least one instruction and the at least one parameter of the at least one instruction;

filtering the at least one received datum to exclude commands including characters that can be used to construct executable code; and in response to the filtering, if the at least one received datum represents a valid command, converting the at least one received datum to identify the at least one instruction and the at least one parameter of the at least one instruction based on stored correspondence information that maps the at least one datum to the at least one instruction and the at least one parameter of the at least one instruction.

2. The method according to claim 1, further comprising: verifying a signature of the at least one received datum.

3. The method according to claim 1, further comprising: storing in memory the correspondence information that maps the at least one datum to the at least one instruction and the at least one parameter of the at least one instruction.

4. The method according to claim 1, wherein the filtering includes an iterative filtering based on at least two distinct criteria.

5. The method according to claim 4, wherein at least one of the at least two criteria is associated with a protocol for transmission of the at least one datum.

6. The method according to claim 4, wherein at least one of the at least two criteria is related to the encoding of the at least one datum representative of the at least one command.

7. The method according to claim 1, further comprising: transmitting at least one information item related to execution of the at least one instruction.

8. The method according to claim 7, further comprising: signing the at least one information item.

9. The method according to claim 1, wherein the at least one datum includes only ASCII characters having values from 032 to 090.

10. An on-board maintenance device comprising:

a communication module that receives, from a remote system connected via a communication network, at least one datum representative of at least one command having a correspondence with at least one executable instruction and at least one parameter of the at least one executable instruction;

a filtering module that filters the at least one received datum to exclude commands including characters that can be used to construct executable code; and a conversion module that converts the at least one received datum to identify the at least one instruction and the at least one parameter of the at least one executable instruction based on stored correspondence information that maps the at least one datum to the at least one instruction and the at least one parameter of the at least one instruction, if the at least one received datum represents a valid command as determined by the filtering module.

11. The device according to claim 10, further comprising:

a verifying module that verifies a signature of the at least one received datum.

12. The device according to claim 10, further comprising:

a memory that stores the correspondence information that maps the at least one datum to the at least one instruction and the at least one parameter of the at least one instruction.

13. The device according to claim 10, wherein the filtering module is configured to perform an iterative filtering based on at least two distinct criteria.

14. The device according to claim 13, wherein at least one of the at least two criteria is associated with a protocol for transmission of the at least one datum.

15. The device according to claim 13, wherein at least one of the at least two criteria is related to the encoding of the at least one datum representative of the at least one command.

16. The device according to claim 10, wherein the communication module is further configured to transmit at least one information item related to execution of the at least one instruction.

17. The device according to claim 16, further comprising:

a signing module that signs the at least one information item.

18. The device according to claim 10, wherein the at least one datum includes only ASCII characters having values from 032 to 090.

19. An aircraft comprising:

an on-board maintenance device including a communication module that receives, from a remote system connected via a communication network, at least one datum representative of at least one command having a correspondence with at least one instruction and at least one parameter of the at least one executable instruction, a filtering module that filters the at least one received datum to exclude commands including characters that can be used to construct executable code, and a conversion module that converts the at least one received datum to identify the at least one instruction and the at least one parameter of the at least one executable instruction based on stored correspondence information that maps the at least one datum to the at least one instruction and the at least one parameter of the at least one instruction, if the at least one received datum represents a valid command as determined by the filtering module.

* * * * *